United States Patent [19]

Church, Jr.

[11] 4,020,864

[45] May 3, 1977

[54] BALL VALVE

[76] Inventor: Edgar H. Church, Jr., 1301 Cactus Drive, Baytown, Tex. 77520

[22] Filed: July 16, 1975

[21] Appl. No.: 596,440

[52] U.S. Cl. .............................. 137/242; 251/172; 251/174
[51] Int. Cl.² ........................................ F16K 15/00
[58] Field of Search .......... 251/170, 172, 174, 171; 137/242

[56] References Cited

UNITED STATES PATENTS

| | | | |
|---|---|---|---|
| 1,116,741 | 11/1914 | Roney | 251/170 |
| 2,573,177 | 10/1951 | Bohlen | 251/174 X |
| 2,890,856 | 6/1959 | Clade | 251/174 |
| 3,333,813 | 8/1967 | Rabe | 251/172 |
| 3,394,915 | 7/1968 | Gachot | 251/174 |
| 3,520,512 | 7/1970 | Huber | 251/172 |
| 3,591,134 | 7/1971 | Fujiwara | 251/174 X |

Primary Examiner—Harold W. Weakley
Attorney, Agent, or Firm—Bard, Springs & Jackson

[57] ABSTRACT

In one exemplar embodiment, an improved ball valve is provided in which a movable seating ring is concentrically carried by the inner diameter of a spring washer concentrically disposed in the inlet port of the ball valve housing. The spring washer is retained in place about its outer diameter portion by means of a retaining ring removably inserted in the inlet port of the valve body. The spring washer is sealed to the valve body by means of a conventional circular seal disposed between the face of the spring washer and the valve body. When the valve is closed, the differential pressure developed across the ball acts on the outer surface of the spring washer and transmits additional sealing force to the seating ring in contact with the ball for increased sealing. The surface of the retaining ring facing the spring washer is conical to form a wedge-shaped void therebetween to permit movement of the spring washer and seating ring even though solid particles from the fluid stream accumulate between the retaining ring and spring washer.

14 Claims, 5 Drawing Figures

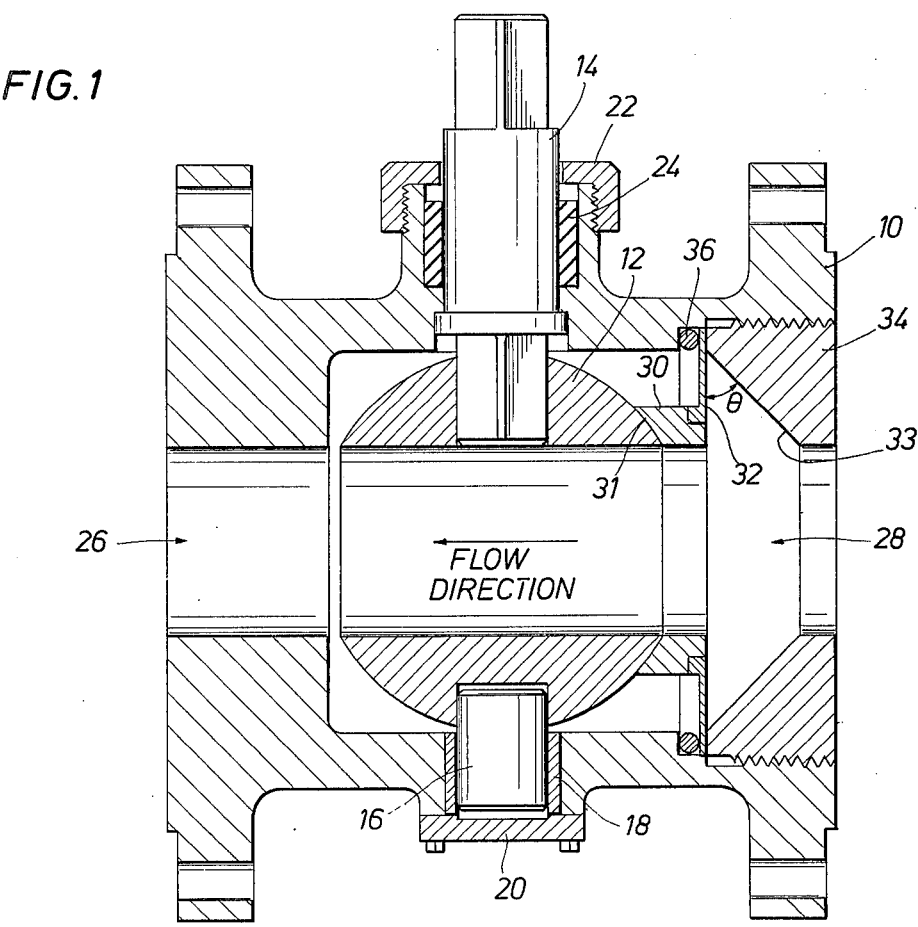
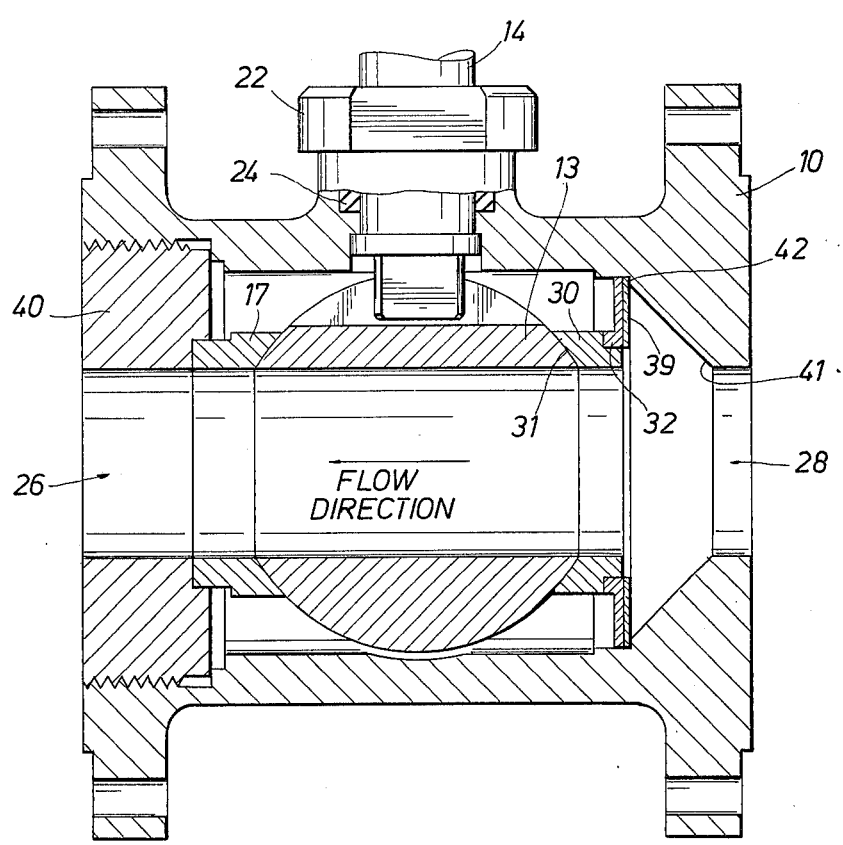

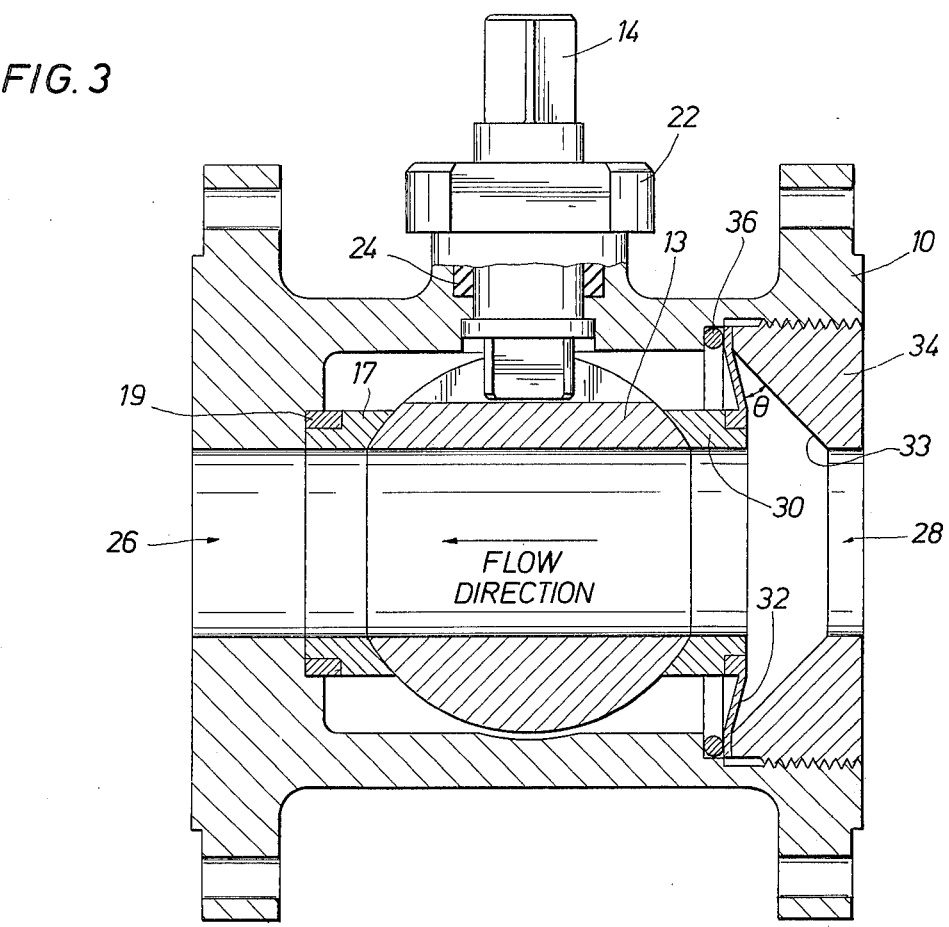
FIG. 3
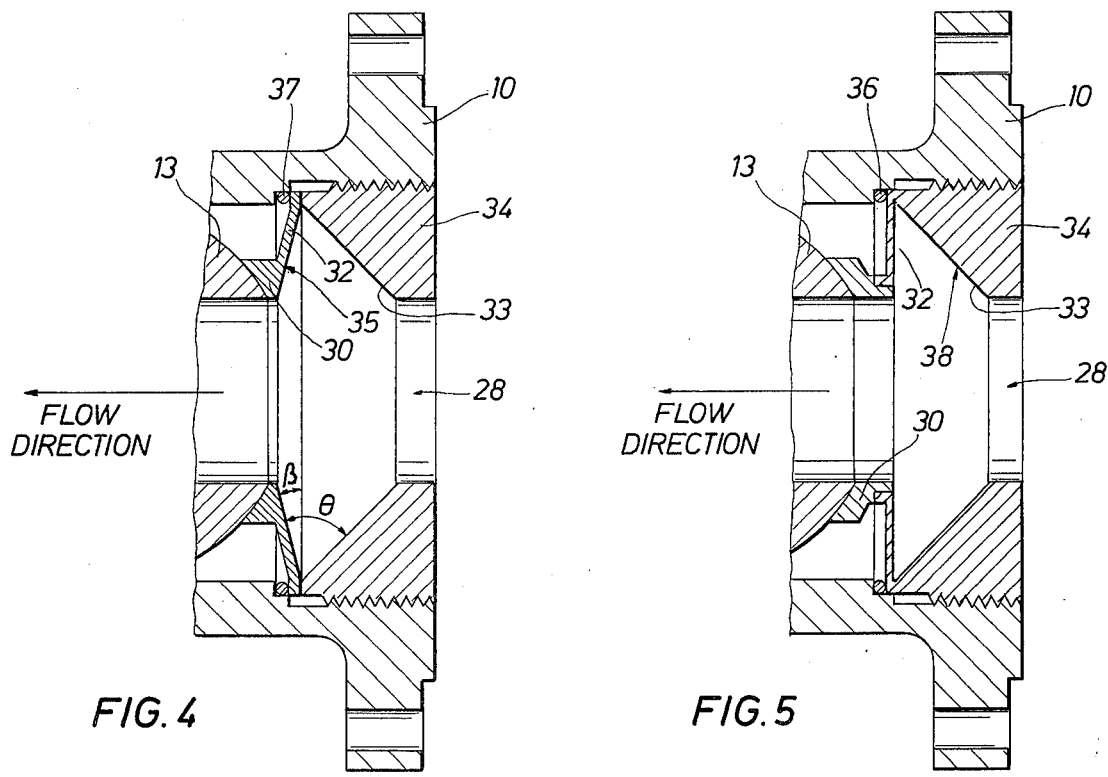
FIG. 4
FIG. 5

BALL VALVE

BACKGROUND OF THE INVENTION

This invention relates to improvements in ball valves and particularly to the movable spring-loaded seat utilized to seal the inlet port of the valve body from the exterior of the valve ball.

In conventional ball valves, considerable difficulty has been experienced in applications involving high pressures and higher temperatures, i.e., over 1,000° F., particularly where the fluid stream contains appreciable quantities of solid particles. The solid particles tend to pack around the movable seat and the thermal cycling and high temperatures cause relatively large thermal distortions as the solid particles expanded with temperature. The packing of the solid particles around the movable seat limited its movement, and when coupled with the thermal distortion which caused relative motion of the seat toward the ball of over 0.01 inches, in some cases, caused a binding between the ball and movable seat. Such binding made operation of the ball valve difficult and contributed to increased wear between the valve ball and the seat.

Accordingly, one primary feature of the present invention is to provide a improved ball valve that may be operated at sustained temperatures above 1,000° F.

Another feature of the present invention is to provide an improved seat spring in the form of a spring washer that can absorb greater flexing movement due to thermal distoration and maintain a satisfactory seating force without exceeding allowable stresses in the spring.

Yet another feature of the present invention is to provide a conical surface on the inlet throat of the valve facing the spring washer that provides a wedge-shaped void therebetween in order that any accumulation of solid particles will be moved and released by the flexing of the seat spring, eliminating the possibility of an accumulation of solid particles restricting the movement of the spring and seat to cause binding between the ball and seat.

Still another feature of the present invention is to provide an improved ball valve where the spring washer is sealed to the valve body and the movable seat is sealed to the valve ball on the inlet side of the ball, thereby developing additional seating force when the differential pressure across the ball is increased, such as when the ball valve is closed.

SUMMARY OF THE INVENTION

The present invention remedies the problems of the prior art by providing an improved ball valve having a novel movable seat, seat spring and conical throat surface facing the seat spring in the inlet port. The movable seat has an arcuate seating surface for sealingly seating with the outer surface of the valve ball, and is concentrically carried by the inner diameter portion of a spring washer concentrically disposed in the inlet port side of the valve body. The surface of the inlet port throat facing the spring washer is tapered or conical in cross-section and provides a wedge-shaped void between it and the seat spring in order that any accumulation of solid particles may be moved by the flexing of the spring washer to eliminate the possibility of the solid particles restricting movement of the spring and seating ring to cause binding between the seat and the valve ball. In some embodiments, this tapered conical throat may take the form of a retainer ring threadably mated into the inlet port of the valve body and seals the spring washer to the valve body by means of a conventional seal.

The spring washer may be of a flat or conical cross-sectional configuration, with the conical surface projecting toward the inlet port of the valve housing for causing a larger angle between the spring washer and the conical surface of the retainer ring and to increase the spring loading. The spring loading may be made relatively large through the use of back-up springs. The seating ring and the spring washer may be combined into a unitary element fabricated from one material. Similarly, the spring washer and retaining ring may be combined into a unitary element fabricated from one material. A trunnion ball valve may have spring-loaded movable seats on the inlet and outlet sides of the valve for use in bi-directional fluid flow.

Because the seat spring is sealed against the valve body and the movable seating ring, additional seating forces are developed on the movable seat when the differential pressure across the valve ball is increased. Thus the seating pressure is automatically adjusted to compensate for any change in the differential pressure across the valve. The sealing pressure may therefore be somewhat lower during a major portion of the ball's rotation than that developed in the closed position of the ball, thus resulting in longer ball and seat life.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of the specification. It is to be noted, however, that the appended drawings illustrate only typical embodiments of the invention and therefore are not to be considered limiting of its scope, for the invention may admit to further equally effective embodiments.

In the drawings:

FIG. 1 is a detailed cross-sectional view of a trunnion ball valve employing one embodiment of the invention.

FIG. 2 is a detailed cross-sectional view of a floating ball valve utilizing a second embodiment of the invention.

FIG. 3 is a detailed cross-sectional view of a floating ball valve illustrating another embodiment of the present invention.

FIG. 4 is a partial detailed cross-sectional view of a ball valve illustrating yet a fourth embodiment of the present invention.

FIG. 5 is a partial detailed cross-sectional view of a ball valve showing yet a fifth embodiment of the present invention.

By way of example, and not of limitation, one application of the present invention is in a plant which converts chemically active coal into chemical products. The coal is generally ground to particulate size and fed to a reactor operating at temperatures around 1,000° F. and pressures of around 1,000 ps. The residue from the reaction is called char and is a porous rock-like material which carries some of the chemical constitutents. The char is dropped from the reactor into a disposal system in which ball vavles are utilized to control the flow. The system ball valves are thus subjected to sudden pressurization when exposed to the reactor and to high gradient thermal cycling when a batch of char at around 1,000° F. enters the system, which has usually cooled to around 400°F. Additionally, the chemicals which are retained in the char increase the agglomerating characteristics of the particulate material and aggravate the problem of particulate packing inherent in any system transporting a fluid stream containing particulate matter.

DETAILED DESCRIPTION OF THE PREFERRED EMBODIMENTS

Referring now to FIG. 1, a trunnion ball valve utilizing one embodiment of the present invention is shown. The trunnion ball valve consists of a housing 10 having an inlet port 28 and an outlet port 26 and carrying therein a valve ball 12 supported by a trunnion 16 and operated by a stem 14. The trunnion 16 is supported by a bearing or packing 18 in housing 10, and access to trunnion 16 is sealed by an access cover or plate 20. Valve stem 14 is sealed by an access cover plate 20. Valve stem 14 is sealed in housing 10 by means of a packing 24 which is retained within housing 10 by means of a packing cup or cover 22.

The invention comprises a movable valve seating ring 30 concentrically carried by the inner diameter of a spring washer coaxially disposed within inlet port 28 of housing 10, and cooperating with a conical throat surface 33 in the inlet port opening. A retaining ring 34 may be utilized and is threaded and mates with a threaded portion of housing 10 to force the outer diameter of spring washer 32 against a seal 36, which may be an O-ring seal, either metallic or of a selected high temperature-resistant synthetic material. Retaining ring 34 has an inwardly projecting conical surface 33 facing spring washer 32 for purposes to be hereinafter further described. In this embodiment, the spring washer 32 has a flat cross-sectional configuration.

In operation, the fluid passing through the valve housing 10 enters through inlet port 28, passes through the ball valve 12, and exits through exit or outlet port 26. The arcuate seating surface 31 of seating ring 32 is in sealing contact with the outer surface of valve ball 12. When the valve ball 12 is turned to its closed position by means of operating stem 14, a differential pressure develops across the closed ball 12 which provides differential forces, acting in the direction of flow, applied to the surface of spring washer 32, thus providing additional sealing force to the movable seating ring 30, resulting in a tighter seal. The conical surface 33 of spring retainer 34 provides a wedge-shaped void or cavity between the surface and the spring washer 32 in order that any agglomerating of material from the fluid stream may be moved by the flexing of spring washer 32 due to pressure differentials, thus eliminating the possibility that solid particles or other deposit accumulation may collect between spring washer 32 and spring retainer 34 that would restrict the movement of the spring 32 and seat 30 so as to cause the seat 30 to bind against the ball 12.

In FIG. 1, an angle $\theta$, between the surface of spring washer 32 and surface 33, is shown. This angle should be as large as practical for breaking loose an agglomeration of solid material or particles that may tend to form a solid "doughnut-shaped" piece of material of triangular cross-section that can interfere with free movement by seat 30. This is particularly true when the agglomerating material is viscous at high temperatures but upon temperature cycling cools to a solid material.

It has been found that the larger the angle $\theta$, the greater the ability of the spring washer 32 to break loose accumulated materials. If $\theta$ is less than 90°, the wedge-shaped void formed between seat 32 and surface 33 helps break up agglomerating solids but is less effective than an angle $\theta$ greater than 90°. However, with angle $\theta$ greater than 90°, spring loading with high stresses is encountered and limits the spring movement.

All of the parts of the ball valve, including the valve seating ring 30, spring washer 32 and retainer ring 34, are fabricated from high temperature resistant materials, for operation in ranges of 1,000° F. or greater. Typical materials in test valves included polished and accurately machined tungsten carbide for the ball and seats. The spring washer was conveniently fabricated from high temperature corrosion resistant stainless steel alloy. The retainer ring could be stainless steel, tungsten carbide or other suitable material. The valve body could be made of stainless steel. The O-ring seal may be of metal with a soft metal surface, such as gold, copper or silver. The spring washer 32 has a larger ratio of outer diameter to inner diameter than conventional spring washers for providing additional flexing when the ball valve is closed, as hereinabove described. In addition, the additional size enable the spring to absorb greater flexing due to thermal distortions and to maintain a satisfactory seating force without exceeding allowable stresses in the spring. Although the valve seating ring 30 is in sealing contact with the surface of ball 12 at all times, as hereinabove described, the unique flexing action of spring washer 32 allows added sealing pressure to be applied between the seating surface 31 of valve seating ring 30 and the outer surface of ball 12 when the ball valve is closed, due to the differential pressure developed across the ball and transmitted to the spring washer 32. Thus the seating pressure is automatically adjusted to compensate for anu change in the differential pressure across the valve. This permits the sealing pressure to be somewht lower during a major portion of the ball's rotation than that developed in the closed position. This lowered seat pressure results in longer ball 12 and seat 30 life. In some applications sealing can be enhanced by use of a liquid sealant disposed on the surface of the ball.

Referring now to FIG. 2, a floating ball valve is shown utilizing a second embodiment of the present invention. Valve housing 10 is provided, having an inlet port 28 and an outlet port 26 carrying a floating ball 13 that is supported in position by means of a fixed valve seating ring 17 and a movable seating ring 30, the latter of which forms a portion of the present invention and will be hereinafter further described. The rotational motion of ball 13 is controlled by means of stem 14 which is conventionally retained within housing 10 by means of packing 24 and the packing or sealing cup 22.

The movable valve seating ring 30 is concentrically carried by the inner diameter of a valve washer 32 and a back-up spring washer 39 which are dispoed against a shoulder 42 in valve body 10. Fixed valve seat 17 is retained in valve body 10 by means of a removable retainer plug 40. The inlet port 28 has a conical shaped surface 41 tapering from the washers 32 and 39 to the outlet port 26. The operation and features of the invention, comprising valve seating ring 30, spring washer 32, and tapered surface 41, are identical to those hereinabove described with regard to the embodiment shown in FIG. 1 and will not be further described herein. The back-up spring washer 39 provides additional spring loading to increase the spring loading on seating ring 30.

Referring now to FIG. 3, another floating ball valve sealing arrangement is shown. In FIG. 3, the valve housing 10, floating ball 13, stem 14, packing 24 and packing cup 22 are identical to the parts having the same name and identification as hereinabove described with regard to FIGS. 1 and 2. In FIG. 3, the fixed valve seat 17 is comprised of a metal retaining ring 19 carrying a fixed valve seating ring 17. The seating ring is formed of a material capable of withstanding high temperatures in the range of 1,000° F. The invention, as hereinabove described with regard to FIGS. 1 and 2, comprises a movable seating ring 30, carried concentrically by the inner diameter of a spring washer 32, and retained in place by means of retainer ring 34, and sealed by means of a conventional seal 36. The function and features of the movable valve seating ring 30, spring washer 32 and retainer ring 34 are identical to that hereinabove described. The only difference in the embodiment shown of the spring washer in FIG. 3, as contrasted with the spring washers 32 shown in FIGS. 1 and 2, is that the spring washer 32 of FIG. 3 has a conical cross-sectional configuration such that the inner diameter of spring washer 32 is offset toward the inlet port 28 from the outer diameter of the spring washer 32. This conical cross-sectional configuration of the washer provides a larger spring loading. Such a conical cross-sectional configuration of washer 32, in connection with the conical surface 33 of retainer ring 34, provides a wedge-shaped void having a smaller acute angle therebetween for increasing the probability that solid particles or other deposited accumulations will not hinder movement of the spring 32 and seat 30, thus eliminating the possibility that seat 30 will bind against the surface of ball 13 when cooled after heating, particularly at the elevated temperatures in which the ball valve is to be utilized, i.e., 1,000° F. or above. The size of angle $\theta$ determines the effectiveness of the spring washer 32 in "breaking" solid materials, as hereinabove discussed. The smaller the angle, the more severe the effect of binding will be from the deposit of solids in the wedge shaped void or space. The advantage of this configuration is the increased spring constant of the conical spring washer and the shorter overall length of the valve structure.

In FIG. 4, yet a fourth embodiment of the present invention is shown. A combined unitary spring washer and valve seating ring 35 are shown fabricated as a unitary piece from the same material, having a valve seating ring portion 30 and a spring washer portion 32. The combination spring washer and valve seating ring 35 is retained in position by means of a retainer ring 34 and a seal 37, as hereinabove previously described. The spring washer portion 32 of the combination spring washer and sealing ring 35 has a conical cross-sectional configuration, having an angle $\theta$ greater than 90°. With conical cross-section washers, as the angle $\beta$ increases, the spring washerexhibits a greater stiffness and spring constant, coupled with a shorter range of travel. With the angle $\theta$ in the 110° to 120° range, the conical spring washer would probably function at its optimum. However, the throat distance of surface 33 may increase to such a length as not to be practical in a particular valve body size. The functions and features of the invention shown in FIG. 4 are identical to those prviously described with regard to the invention depicted in FIGS. 1–3, and will not be further described herein.

In FIG. 5, yet a fifth embodiment of the present invention is shown, in which a valve seating ring 30 is carried by the inner diameter of a spring washer portion 32 of a combined retainer ring and spring washer element 38. The combination element 38 is comprised of a spring washer portion 32 and a retainer nut or ring 34, fabricated as a unitary piece from one material. The spring washer portion 32 is sealed into housing 10 by means of a conventional seal 36, such as an O-ring. The functions of the movable valve seating ring 30, spring washer portion 32 and retaining ring portion 34 of the combination retainer ring and spring washer 38 are identical to the operation and features of the invention as previously described with regard to FIGS. 1–4 and will not be herein further discusssed.

Numeroud variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. In a ball valve utilized in high temperature applications having appreciable quantities of agglomerating materials in the fluid stream, characterized by having a valve body having inlet and outlet ports, a ball, a valve stem, a packing cup, stem packing and a valve seat, an improved movable valve seating means comprising
   a spring washer coaxially disposed in said valve body inlet port upstream of said valve ball,
   a movable valve seating ring coaxially carried by the inner diameter portion of said spring washer and having an arcuate seating surface for sealing contact with the surface of said valve ball, said spring washer flexing under the differential pressure applied over the spring washer surface when said vale ball is closed for increasing the sealing force exerted by said valve seating ring against said valve ball, and
   an inlet port throat having a conical surface tapering toward said spring washer and terminating adjacent said washer for providing a wedge-shaped void therebetween opening into the fluid stream through the valve, said conical surface cooperating with the relative movement of said spring washer due to pressure and thermal differentials for forming a means for subjecting solid agglomerating material accumulating adjacent to and upstream of said spring washer to shear forces for fracturing said solid agglomerating material and expelling said material into the fluid stream.

2. The improvement defined in claim 1, further including a spring retainer ring removably disposed in the inlet port of said valve body to retain said spring washer in place, said retainer ring having said conical throat surface tapering toward said spring washer for providing said wedge-shaped void therebetween for permitting agglomerated materials in said void tp move upon flexing of said spring washer.

3. The improvement defined in claim 1, wherein said spring washer has a flat cross-sectional configuration.

4. The improvement defined in claim 1, wherein said spring washer has a conical cross-sectional configuration.

5. The improvement defined in claim 1, wherein said spring washer and valve seating ring form a unitary element fabricated from a single material.

6. The improvement defined in claim 1, wherein said spring washer and said spring retainer ring form a unitary element fabricated from a single material.

7. An improved ball valve for utilization in high temperature applications having appreciable quantities of agglomerating material in the fluid stream, comprising
a valve body having inlet and outlet ports,
a valve ball disposed in said valve body between said inlet and outlet ports,
a valve stem projecting through said valve body and connected to said valve ball for controlling the rotation of said ball,
sealing means for sealing the space between said valve body and said valve stem,
a spring washer coaxially disposed in said inlet port of said valve body upstream of said valve ball,
a movable valve seating ring coaxially carried by the inner diameter portion of said spring washer and having an arcuate seating surface for sealing engagement with the seating surface of said valve ball, said spring washer flexing under the differential pressure applied over the spring washer surface when said valve ball is closed for increasing the sealing force exerted by said valve seating ring against said valve ball, and
an inlet port throat having a conical surface tapering toward said spring washer and terminating adjacent said washer for forming a wedge-shaped cavity therebetween opening into the fluid stream through the valve, said conical surface cooperating with the relative movement of said spring washer due to pressure and thermal differentials for forming a means for subjecting solid agglomerating material accumulating adjacent to and upstream of said spring washer to shear forces for fracturing said solid agglomerating material and expelling said material into the fluid stream.

8. The ball valve defined in claim 7, further including a spring retainer ring disposed in the inlet port of said valve body for retaining said spring washer in place, the inner surface of said spring retainer ring facing said spring washer having a conical cross-sectional configuration for forming said wedge-shaped cavity between said spring retainer ring and said spring washer for permitting agglomerated materials from the fluid stream to move upon flexing of said spring washer.

9. The valve defined in claim 7, wherein said spring washer has a flat cross-sectional configuration.

10. The valve defined in claim 7, wherein said spring washer has a conical cross-sectional configuration.

11. The valve defined in claim 7, wherein said spring washer and valve seating ring are formed together as a unitary element.

12. The valve defined in claim 7, wherein said spring washer and said spring retainer ring are formed together as a unitary element.

13. The valve defined in claim 7, wherein said valve ball is of a floating type and wherein said valve further includes a fixed valve setting ring coaxially disposed in said valve body adjacent said outlet port for contacting and supporting said valve ball and sealingly contacting said valve ball surface.

14. An improved ball valve for utilization in high temperature applications having appreciable quantities of agglomerating materials in the fluid stream, comprising
a valve body having inlet and outlet ports,
a valve ball disposed in said valve body between said inlet and outlet ports,
a valve stem projecting through said valve body and connected to said valve ball for controlling the rotation of said ball,
sealing means for sealing the space between said valve body and said valve stem,
a spring washer coaxially disposed in said inlet port of said valve body upstream of said valve ball,
a movable valve seating ring coaxially carried by the inner diameter portion of said spring washer and having an arcuate seating sealing engagement with the seating surface of said valve ball, said spring washer flexing under the differential pressure applied over the spring washer surface when the said valve ball is closed for increasing the sealing force exerted by said valve seating ring against said valve ball, and
a spring retainer ring disposed in the inlet port of said valve body for retaining said spring washer and valve seating ring in place, the surface of said spring retainer ring facing said spring washer having a conical cross-sectional configuration for forming a wedge-shaped cavity between said spring retainer ring and said spring washer, said conical surface cooperating with the relative movement of said spring washer due to pressure and thermal differentials for forming a means for subjecting solid agglomerating material accumulating adjacent to and upstream of said spring washer to shear forces for fracturing said solid agglomerating material and expelling said material into the fluid stream.

* * * * *

UNITED STATES PATENT OFFICE
CERTIFICATE OF CORRECTION

Patent No. 4,020,864     Dated May 3, 1977

Inventor(s) Edgar H. Church, Jr.

It is certified that error appears in the above-identified patent and that said Letters Patent are hereby corrected as shown below:

In the specification:

Col. 2, line 62, after 1,000, change "ps" to --psi--;

Col. 3, line 54, after "pressure" add --differentials or expansion of the spring washer due to thermal--;

Col. 4, line 37, change "anu" to --any--;

Col. 4, line 39, change "somewht" to --somewhat--;

Col. 5, line 59, change "washerexhibits" to --washer exhibits--;

Col. 6, line 15, change "Numeroud" to --Numerous--.

In the Claims:

Col. 6, line 38, change "vale" to -valve--.

Signed and Sealed this

Thirteenth Day of September 1977

[SEAL]

Attest:

RUTH C. MASON
Attesting Officer

LUTRELLE F. PARKER
Acting Commissioner of Patents and Trademarks